US005545872A

United States Patent [19]
Nakajima et al.

[11] Patent Number: 5,545,872
[45] Date of Patent: Aug. 13, 1996

[54] PRESSURE CONTROLLER AND PRESSURE CONTROL METHOD FOR RESISTANCE WELDER

[75] Inventors: Toshiharu Nakajima, Yokkaichi; Satoru Machimura, Suzuka; Tadashi Goto, Mie-ken; Toshitaka Mochizuki, Suzuka; Shinji Hoshino, Suzuka; Hiroshi Ohtani, Suzuka, all of Japan

[73] Assignee: Honda Giken Kogyo Kabushiki Kaisha, Tokyo, Japan

[21] Appl. No.: 331,701

[22] Filed: Oct. 31, 1994

[30] Foreign Application Priority Data

Mar. 14, 1994 [JP] Japan .................................. 6-069047
Mar. 29, 1994 [JP] Japan .................................. 6-058986

[51] Int. Cl.$^6$ ................................................. B23K 11/36
[52] U.S. Cl. .............................................. 219/89; 219/86.51
[58] Field of Search ............................ 219/89, 90, 91.1, 219/86.41, 86.51, 86.8, 119; 76/1; 409/132, 219

[56] References Cited

U.S. PATENT DOCUMENTS

| 4,727,775 | 3/1988 | Nishiwaki | 76/1 |
| 4,733,042 | 3/1988 | Nishiwaki | 219/89 |
| 5,333,975 | 8/1994 | Nishiwaki | 409/132 |

FOREIGN PATENT DOCUMENTS

6-91381  9/1992  Japan .

Primary Examiner—Teresa J. Walberg
Assistant Examiner—J. Pelham
Attorney, Agent, or Firm—Dickstein, Shapiro & Morin, LLP

[57] ABSTRACT

An improved tip dressing process is provided wherein the pressure between the electrode tip of a resistance welder and the cutter of a tip dresser is varied during the tip dressing process. A pressure controller is also provided for controlling the pressure between the electrode tip and cutter during the tip dressing process. The pressure controller may be applied to independently control the tip dressing process of several resistance welders simultaneously.

8 Claims, 7 Drawing Sheets

PRESSURE CONTROLLER AND PRESSURE CONTROL METHOD FOR RESISTANCE WELDER

BACKGROUND OF THE INVENTION

1. Field of the Invention

The present invention relates to pressure control in a resistance welder. More particularly, the present invention relates to pressure control of a tip dresser cutter at the time of dressing an electrode tip of a resistance welder. Further, the present invention relates to a pressure control method for dressing the electrode tips of numerous resistance welders with a single dressing pressure controller.

2. Background of the Invention

A method and equipment for dressing the electrode tip of a resistance welder, by changing the pressure of the electrode tip on the cutter of the tip dresser, has been proposed by the applicant of the present invention.

In this method and equipment, the following operations were performed: (1) at the time of setting the electrode tip to the dresser a comparatively weak force was used to press the electrode tip; (2) when the electrode tip came into contact with the dresser, the tip was worked with a strong force applied between the electrode tip and dresser; (3) at the time of finish-cutting a weak force, a force which was weaker than that used to cut the flank side, was used to press the electrode tip; and (4) burrs were removed at the time of cutting by fluctuating the tip.

By changing the pressure of the electrode tip exerted on the cutter while trim-cutting, it was possible to lower the impact force of the electrode tip on the cutter at the time of setting. In making the load on the cutter, etc. smaller the dressing finish of the electrode tip was improved.

In the past, the dressing pressure controller described above was installed in the resistance welder. Hence, not only was the resistance welder made larger, thus occupying a larger floor area, there was also a problem in that the unit price of the welding machine was made higher.

In addition, when multiple resistance welder units were connected to a single driving controller, operations of other resistance welders had to be stopped in order to dress the electrode tip of a single resistance welder. As a result, the availability of the resistance welders dropped.

In the case of a portable tip dresser equipped with a small-sized motor, the dresser was manually transported to the position of the electrode tip, the upper and lower electrode tips were urged to the rotating blade and, by rotating the rotary blade, the surface of both the electrode tips were simultaneously ground.

If, during the initial step of grinding, excessive pressure-contact force was applied to the electrode tip, problems such as excessive bite occurred resulting in damage to the rotating blade. Further, application of too much torque caused heating of the driving motor.

In addition if, after cutting, the rotating blade was stopped without releasing the pressure-contact force of the electrode tip, cutting burrs occurred on the surface of the electrode tip on which finishing had been completed.

The present invention overcomes the above-mentioned problems by providing a pressure controller and pressure control method which will not make the welder too large and too expensive. In accordance with the method of the present invention, even when multiple resistance welders are connected to a single driving controller, the dressing of an electrode tip only for the desired resistance welder, without stopping the working state of other resistance welders, is possible.

Another object of the present invention is to provide a heating controller and heating control method for the resistance welder that can prevent problems such as damage on the surface of the rotating blade and electrode tip. This object is achieved by performing a series of cutting operations to the electrode tips in relation to fitting operations of the tip dresser.

The following operations are performed to achieve the above-noted object: (1) at the time of dressing the electrode tip, the supply of the pressurized fluid to the pressurizing mechanism of the resistance welder is switched from the route used during ordinary welding to the route from the exclusive-use dressing pressure controller; (2) the dressing pressure controller controls the pressure; (3) by the same dressing pressure controller, the pressurizing force is controlled at the time of dressing the electrode tips of multiple resistance welders.

SUMMARY OF THE INVENTION

The present invention achieves the above-mentioned objects by the following: separate from the resistance welder, at the time of dressing the electrode tip, the pressure of the pressurized fluid is changed to control the pressurizing mechanism; a dressing pressure controller is provided, which controls the pressure exerted on the cutter of the tip dresser by the electrode tip, and the composition enables this single dressing pressure controller to control the pressure of the tip dresser of the electrode tip at the time of dressing multiple resistance welders.

Further, the present invention is provided with a proportional valve, which converts the pressurized fluid to a desired setting pressure, and a solenoid valve, that controls the pressurizing mechanism of the electrode tip by changing the flow of the pressurized fluid at the dressing pressure controller. Namely, the present invention has the proportional valve on the input side of the solenoid valve.

Further, the present invention achieves the objects by providing an information-receiving means to receive signals from the tip dressing pressure controller and controls the pressurizing mechanism of the electrode tip, by the signal sent from this tip dresser, when the tip dresser is at the predetermined fitted position.

DETAILED DESCRIPTION OF THE PREFERRED EMBODIMENTS

Figure 1:
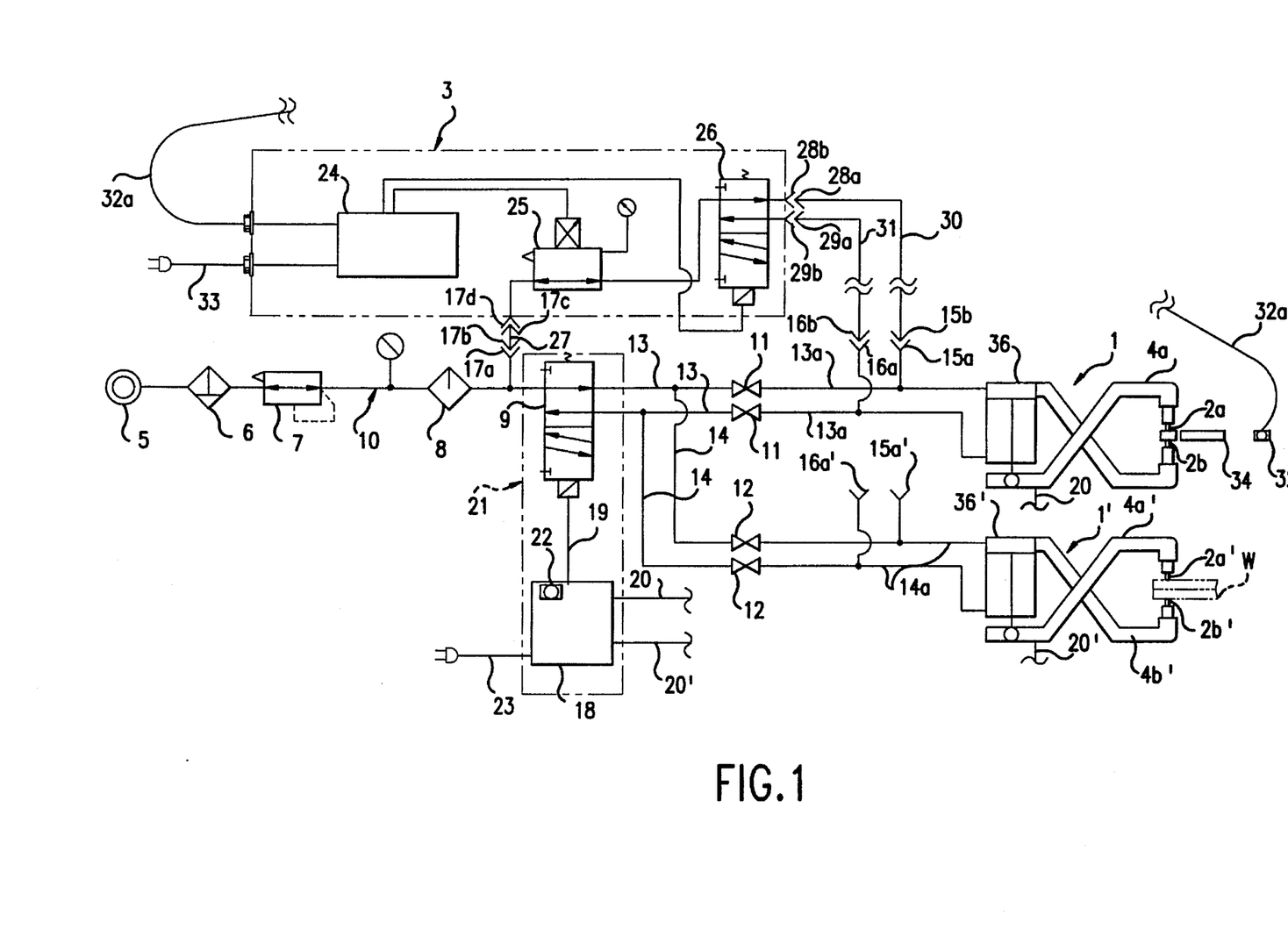
FIG. 1 is a block diagram showing one embodiment of the present invention.

FIG. 1 is a block diagram showing a preferred embodiment of the present invention depicting the air circuit and control circuit. Further, in this embodiment, explanation is given by assuming that two resistance welder units are controlled by a single drive controller.

Two welders 1 and 1' have electrode tips 2b and 2b' at their ends and are provided with fixed arms 4b and 4b', which are securely fixed to these welders 1 and 1', oscillating arms 4a and 4a', which have electrode tips 2a and 2a' at their ends and are installed oscillation-free at these welders 1 and 1', and pressurizing cylinder mechanisms 36 and 36', that actuate the oscillating arms 4a and 4a'. It is arranged so that the oscillating arms 4a and 4a' oscillate by actuation of the pressurizing cylinder mechanisms 36 and 36'. The oscillating arms 4a and 4a' oscillate and clamp the work W to be welded, between welding tips 2a and 2b or 2a' and 2b', thereby performing welding.

Further 5 in FIG. 1 is a pressurized fluid supplier such as a compressor, which supplies pressurized liquid or air, supplied from air piping 10. The pressurized fluid that is produced from this pressurized fluid supplier is supplied to solenoid valve 9 by way of filter 6, regulator 7, and lubricator 8. This solenoid valve 9 activates the pressurizing cylinder mechanisms 36, 36' of the two welders 1 and 1' by switching the air circuit on the command from controller 18. Numeral 19 is a conductor wire, which electrically connects the controller 18 and solenoid valve 9 and is connected to the solenoid of solenoid valve 9.

Further, the controller 18 incorporates the welding current control circuit to supply the welding current to the electrode tips 2a, 2b; 2a', 2b' and is connected to the two welders 1 and 1' through feeder lines 20 and 20'.

In this way, a single drive controller 21, composed of the controller 18 and solenoid valve 9, controls the operations of the two welders 1 and 1'. In addition, this drive controller 21 and the two welders 1 and 1' compose two resistance welder units.

Further, a start switch 22 of the welders 1 and 1' is provided on the controller 18. By turning On this start switch, welding becomes possible by the two resistance welders.

At the air outlet of the solenoid valve 9, a pair of air pipings 13 and 13 are connected. Of these air pipings 13 and 13, one is for supplying air, which will be used to oscillate the oscillating arms 4a and 4a' to clamp the work W between the pair of electrode tips 2a, 2b; 2a', 2b'. The other is used for supplying air, which is used for reverse-operating the pressurizing cylinder mechanisms 36, 36' for releasing the clamping of the work by the electrode tips 2a, 2b; 2a', 2b', At the ends of air pipings 13, 13, switching valves 11 and 11 are provided in order to regulate air passage. These switching valves 11, 11 will, when electrode tips 2a and 2b are to be dressed by tip dresser 34, be manually or automatically closed so that air will be regulated to prevent air from flowing to pressurizing cylinder mechanism 36 from pressurizing solenoid valve 9.

Switching valves 11, 11 and pressurizing cylinder mechanism 36 are connected by air piping 13a, 13a. Female couplers 15a and 16a are provided as joints on the air pipings 13a, 13a.

In addition, air pipings 13a, 13a, are branched on the way, and air pipings 14, 14 are provided which are branching pipings for supplying air to the other welder 1. At the ends of these air pipings 14, 14, switching valves 12, 12, similar to those for air pipings 13, 13, are provided. These switching valves 12, 12 and the welder 1' are connected by air pipings 14a, 14a, and at 14a, 14a, also, female couplers 15a' and 16a', are provided in the same way as in air piping 13a, 13a.

Above-mentioned couplers 15a and 16a; 15a' and 16a' are detachably installed to male couplers 15b and 16b, of separate air pipings 30 and 31, which are connected to dressing pressure controller 3, and these female couplers 15a and 16a, 15a' and 16a' and male couplers 15b and 16b compose the secondary connection means, which permits the supply of air of the predetermined pressure from the dressing pressure controller 3 to pressurized cylinder mechanism 36 (36'). Now, in female couplers 15a and 16a, 15a' and 16a', an air close-down mechanism is incorporated, and when no male couplers 15b and 16b are connected, air will not leak out of air pipings 13a, 13a and 14a, 14a.

Next, the dressing pressure controller 3 will be explained. The dressing pressure controller 3 is provided separately from the resistance welder. At the time of tip dressing, the dressing pressure controller is connected to this resistance welder to press the electrode tips 2a and 2b (2a' and 2b') to the cutter of the tip dresser 34 at a predetermined pressure, and also which changes, as time passes, the pressure of air supplied to pressurizing cylinder mechanism 36 (36'), thereby changing the pressing force of electrode tips 2a and 2b (2a' and 2b') to the cutter.

This dressing pressure controller 3 is composed of proportional valve 25, which reduces the pressure of air supplied from pressurized fluid supplier 5 and converts the supplied air into air having the predetermined pressure of solenoid valve 26. The solenoid valve 26 supplies the air that has been converted to the predetermined pressure, by proportional valve 25, to pressurized cylinder mechanism 36 (36'), which switches the working direction of pressurizing mechanism 36 (36') by switching the air circuit. Controller 24 electrically controls the operation of proportional valve 25 and pressurizing solenoid valve 26.

Between the lubricator 8 lying on the way to air piping 10 and solenoid valve 9, female coupler 17a is provided. Air piping 27, which has freely detachable male coupler 17b at this female coupler 17a, is connected at the air inlet of the proportional valve 25. At the female coupler 17a, an air closedown mechanism is incorporated, in this way when the female coupler 17a is not connected, air will not leak out.

On the other hand, at the air outlet of the solenoid valve 26, air pipings 30 and 31 are provided, as mentioned above. The reason why the proportional valve is located on the air inlet side, and the solenoid valve is provided, is to make the dressing pressure controller smaller. Namely, the air for the time of welding, which is supplied from pressurized fluid supplier 5, has high pressure, and in order to cope with such high-pressurized air, the solenoid valve will be large in size. However, since proportional valve 25 is provided on the air input side and the pressure of the air to be supplied is reduced to the pressure necessary for tip dressing, and since the air which has become low in pressure is supplied to solenoid valve 26, it is possible to make the solenoid valve 26 smaller in size. Therefore, it has become convenient to carry dressing pressure controller 3 when the electrode tip of another resistance welder is to be dressed. Further, the reason why two air pipings 30 and 31 are provided for solenoid valve 26 is the same reason as in the case of air pipings 13, 13 connected to pressurizing solenoid valve 9.

In addition, if the connection-use air pipings 27, 30 and 31 are, as shown in FIG. 1, made detachable from dressing pressure controller 3, using couplers 17c, 17d, 28a, 28b, 29a and 29b respectively, it will become convenient for moving and storing the dressing pressure controller 3.

The controller 24 is electrically connected respectively to proportional valve 25 and solenoid valve 26. When the pressurizing electric current, which corresponds to the pressurizing force to be applied to electrode tips 2a and 2b (2a' and 2b') at the time of tip dressing, is generated from controller 24, the introduced air is converted to the air at the predetermined pressure by proportional valve 25. At the same time, a command signal for actuating the solenoid is applied to solenoid valve 26 and air at the predetermined pressure is supplied to pressurizing cylinder mechanism 36.

Further, 32 is a hand-side switch for starting dressing controller 3. The hand-side switch 32 is electrically connected to controller 24 by connection wiring 32a. The operator can carry out work, while constantly monitoring tip dresser 34, by operating-this hand-side switch 32. In the present preferred embodiment, by separating the dressing pressure controller 3 from the resistance welder. The hand-side switch 32, together with dressing pressure controller 3, are also made separable from the resistance welder. Hence, there is no need for protecting connection wiring 32a and hand-side switch 32 from spattering during welding operation, and this setup also has a feature that long connection wiring 32a will not be in the way of operation.

Figure 2:
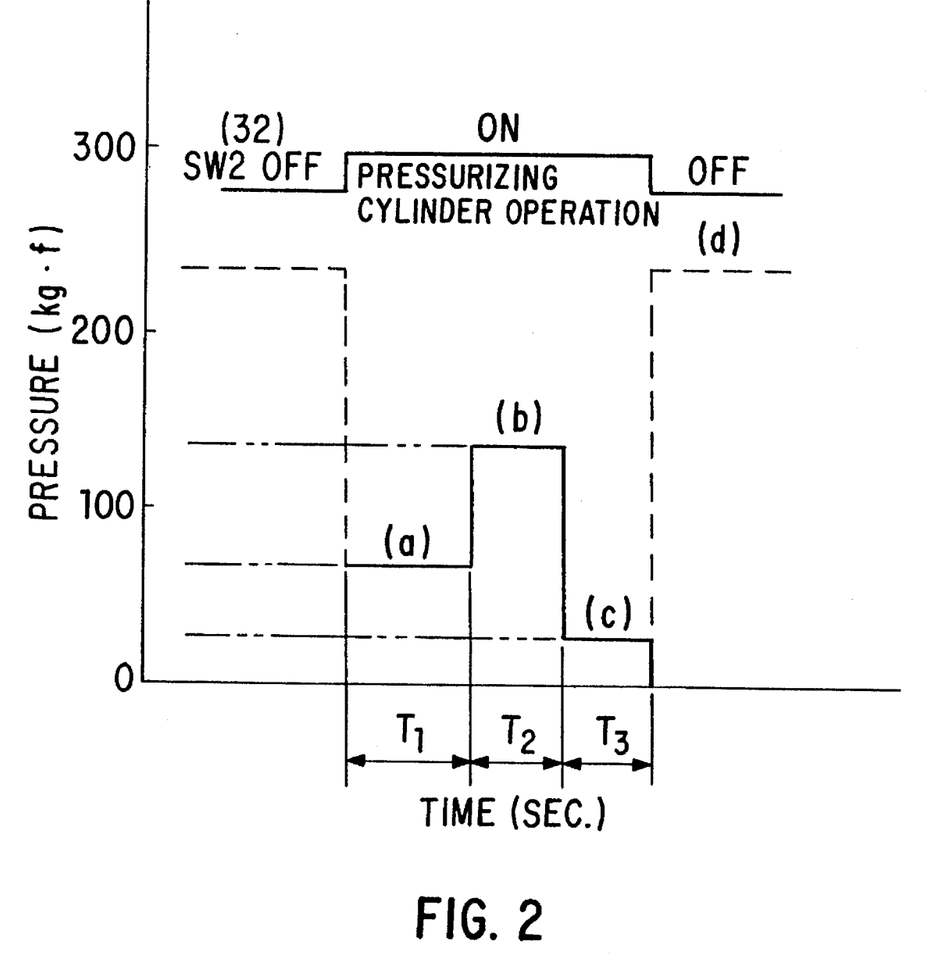
FIG. 2 is an explanatory drawing showing the relationship between the pressurizing force of the electrode tip of FIG. 1 and the elapsed time.

FIG. 2 is a chart showing the relation between pressure, which is applied to electrode tips 2a and 2b (2a' and 2b') and the elapsed time. In the pressure setting Table shown in this Figure, the abscissa represents time T (sec), while the ordinate represents pressurizing force (kgf). First, at electrode tip setting time T1, setting pressure is made lower to Level 3, then (a) "preliminary pressurizing" is then carried out. When electrode tips 2a, 2b and side blade of the cutter come into contact, the set pressure is raised to Level 2 (b) "rough working pressure" is performed. Next, until the electrode tip side cutting time T2 ends, Level 2 (b) is maintained. Before the end-side cutting of electrode tips 2a and 2b is commenced, air pressure is reduced to level 4 (c) and "finish-working" is performed. This Level 4 (c) is maintained until the electrode-tip end-surface cutting time T3 ends. After the cutting of electrode tips 2a and 2b ends, the set pressure is raised to level 1(d) and "pressurizing at the time of welding" is set.

Next, explanation is given to the operation of the present preferred embodiment, composed above.

Air supplied from pressure fluid supplier 5, such as a compressor, flows into solenoid valve 9 by way of air piping 10. In the solenoid valve, the air circuit is changed over according to the control signal from controller 18, air is supplied for welding operation to pressurizing cylinders 36 and 36' of welders 1 and 1' by way of air pipings 13 and 13a, and air pipings 14 and 14a.

At the time of welding, oscillating arms 4a and 4a', oscillate, work W is clamped by welding tips 2a, 2b, 2a'and 2b', and welding operation is carried out responsive to the command signal from controller 18.

After welding operation is ended, solenoid valve 9 changes over the air circuit by reversing the flow to pressurizing cylinders 36 and 36', and the clamping of work W by welding tips 2a, 2b, 2a' and 2b', is released.

When electrode tips 2a and 2b of one resistance welder are to be dressed, starting switch 22 is turned OFF to put welders 1 and 1' into non-working states, and switching valves 11, 11 are closed to stop the air flow from solenoid valve 9 to pressurized cylinder 36.

Next, dressing pressure controller 3 is connected to resistance welder. At this time, male-type coupler 17b of air piping 27, which has been connected to proportional valve 25 is engaged and connected to female-type coupler 17a of air piping 10. At the same time, male-type coupler 15b and 16b of air piping 30 and 31, which have been connected to solenoid valve 26, are engaged and connected to female-type couplers 15a and 16a. Then the cutter of tip dresser 34 is arranged between electrode tips 2a and 2b, and the hand-side switch 32 is turned ON to start the operation of dressing pressure controller 3. Proportional valve 25 reduces the air pressure, which has been supplied from air piping 10 in accordance to set pressurized electric current, and sends air, which has risen to the predetermined pressure, to solenoid valve 26. Solenoid valve 26 supplies air of the predetermined pressure, by the command signals from controller 24, to pressurizing cylinder mechanism 36 by way of air piping 13a. By this air supply, oscillating arm 4a oscillates and presses electrode tips 2a and 2b against the cutter of tip dresser 34. After that, proportional valve 25 changes the air pressure according to changes in the pressurizing electric current, which is generated from controller 24. The changes in air pressure cause corresponding changes in the pressure of electrode tips 2a and 2b to the cutter according to the setting based on the chart shown in FIG. 2.

In this case, switching valves 11, 11 are closed and therefore, air from solenoid valve 26 will not flow to the sides of solenoid valve 9 and the other welder 1'.

When the dressing operation of the electrode tips 2a and 2b is completed, the hand-side switch 32 is turned OFF, the air pipings 27, 30 and 31 are disconnected from air pipings 10, 13a and 13a, and switching valves 11, 11' are opened. When the starting switch 22 is turned ON, welders 1 and 1' are again capable of starting welding operation.

At the time of dressing electrodes tips 2a' and 2b'of other resistance welder, switching valves 12, 12 are closed so that air will not flow from solenoid valve 9 to pressurizing cylinder 36'. Male couplers 15b and 16b are connected to female couplers 15a' and 16a'. Thereafter, repeat the same operations described above.

By installing switching valves 11 and 12 in front of each welder 1 and 1', it has become possible to carry out tip dressing operation of one welder 1 (1'), and it has become also possible to carry out tip dressing operation of one welder 1 (1') and simultaneously to carry out ordinary welding operation by the other welder 1' (1), thereby making it also possible to improve the availability of resistance welders.

In the above-mentioned preferred embodiment, it has been explained that the operations of two units of resistance welders may be controlled by a signal drive controller 21, in the case of three or more resistance welders, air piping 14, 14 or air pipings 13, 13 may be branched according to the number of resistance welders.

According to the present embodiment, even in the case of increasing the number of resistance welder it has been made so that dressing pressure controller 3 can be connected to the resistance welder only at the time of tip dressing so that tip dressing can be performed. As a result, it has become unnecessary to provide dressing pressure controller 3 for each of resistance welder, thereby making the resistance welder smaller and cheaper and has made it possible to use a single dressing pressure controller 3 universally for other resistance welders.

In addition, by installing proportional valve 25 at the inlet side of pressurized fluid of the dressing pressure controller 3, and by providing solenoid valve 26 on the output side, dressing pressure controller 3 can be made smaller in size and easier to transport.

It is further possible to connect plural resistance welders to a single driving controller 21, and to provide switching valves 11, 12 and connecting means by joints to respective branching pipes, which distribute air, so that tip dressing operation and welding operation can be performed in parallel, thereby preventing the drop in availability of resistance welders.

In the above-mentioned preferred embodiment, a joint (female-type coupler) is provided at the piping of the pressurized fluid as the first connection means for supplying pressurized fluid (air in the present embodiment) to dressing pressure controller 3 at the time of dressing of the electrode tip, and as the second connection means for supplying the pressurized fluid from the dressing pressure controller 3 to pressurizing cylinder mechanisms 36 and 36'. A joint (male-type coupler), is also provided at the dressing pressure controller 3, which is engaged with the female joint in a freely detachable manner. In place of these joints, it is also possible to construct a connecting means by using a branching piping, that communicates the piping of the pressurized fluid and dressing pressure controller 3, and a switching valve engaged with this branching piping.

Figure 3:
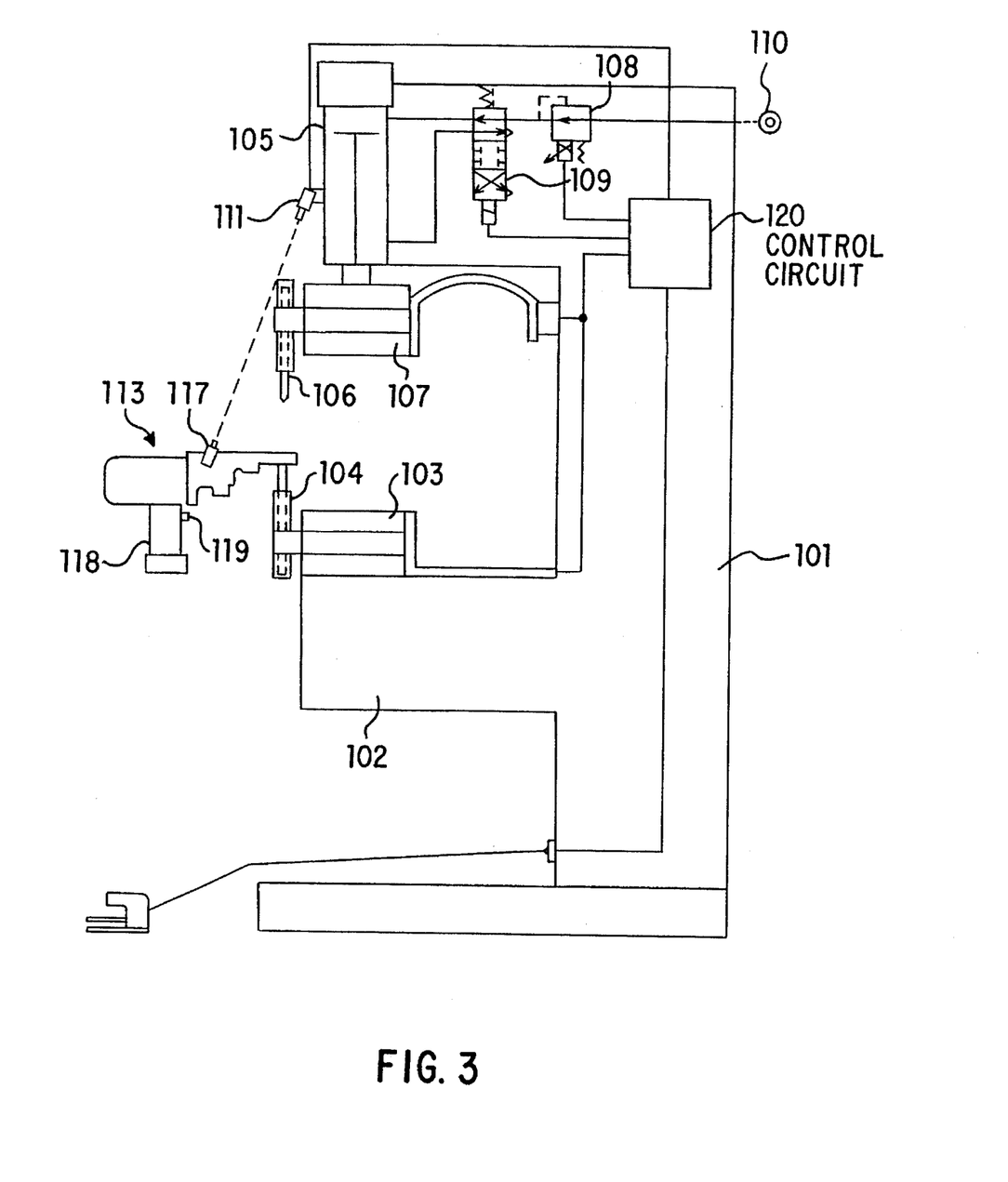
FIG. 3 is a block diagram showing another embodiment of the present invention.
Figure 4:
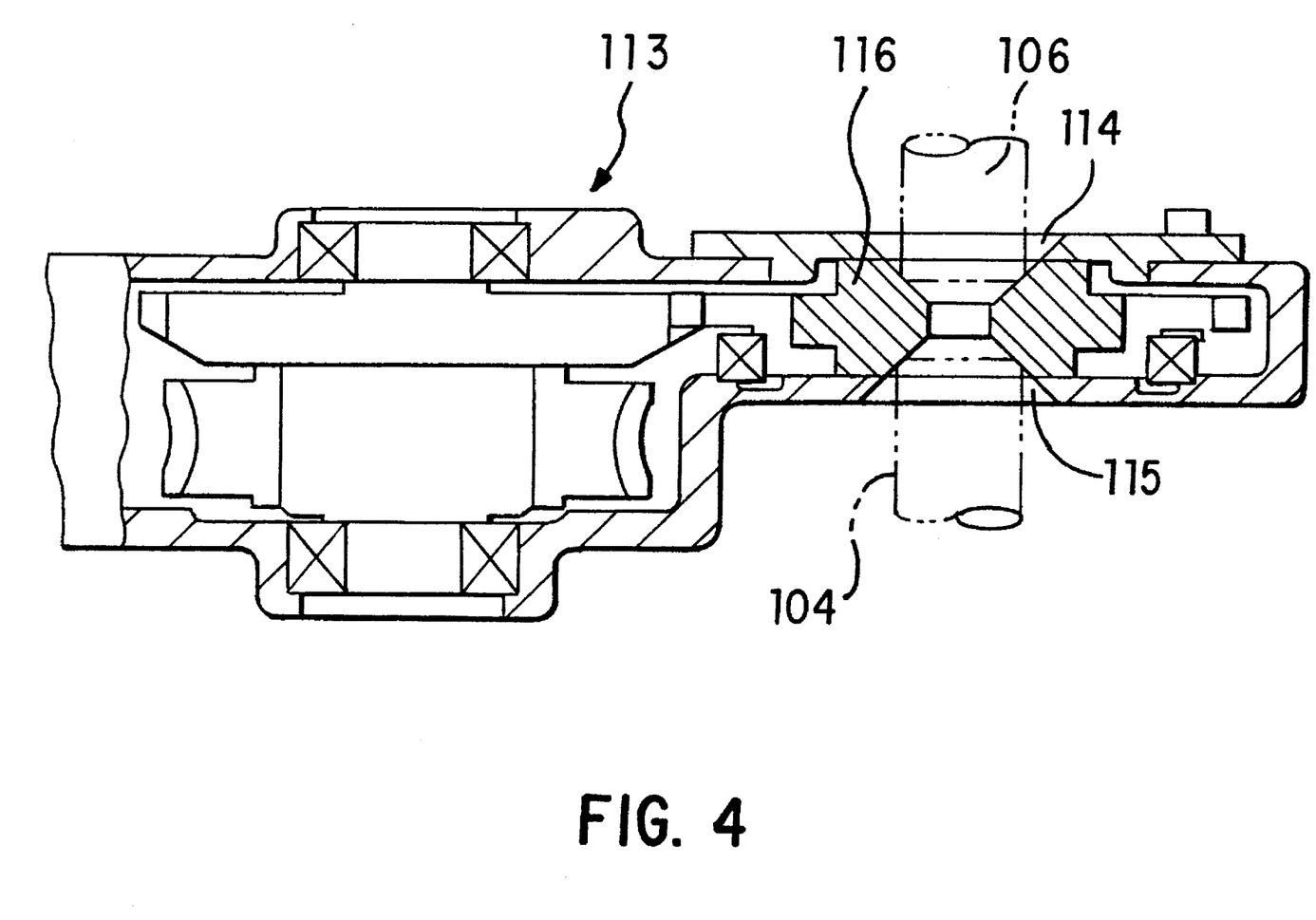
FIG. 4 is a cross section showing an example of the portable tip dresser.
Figure 5:
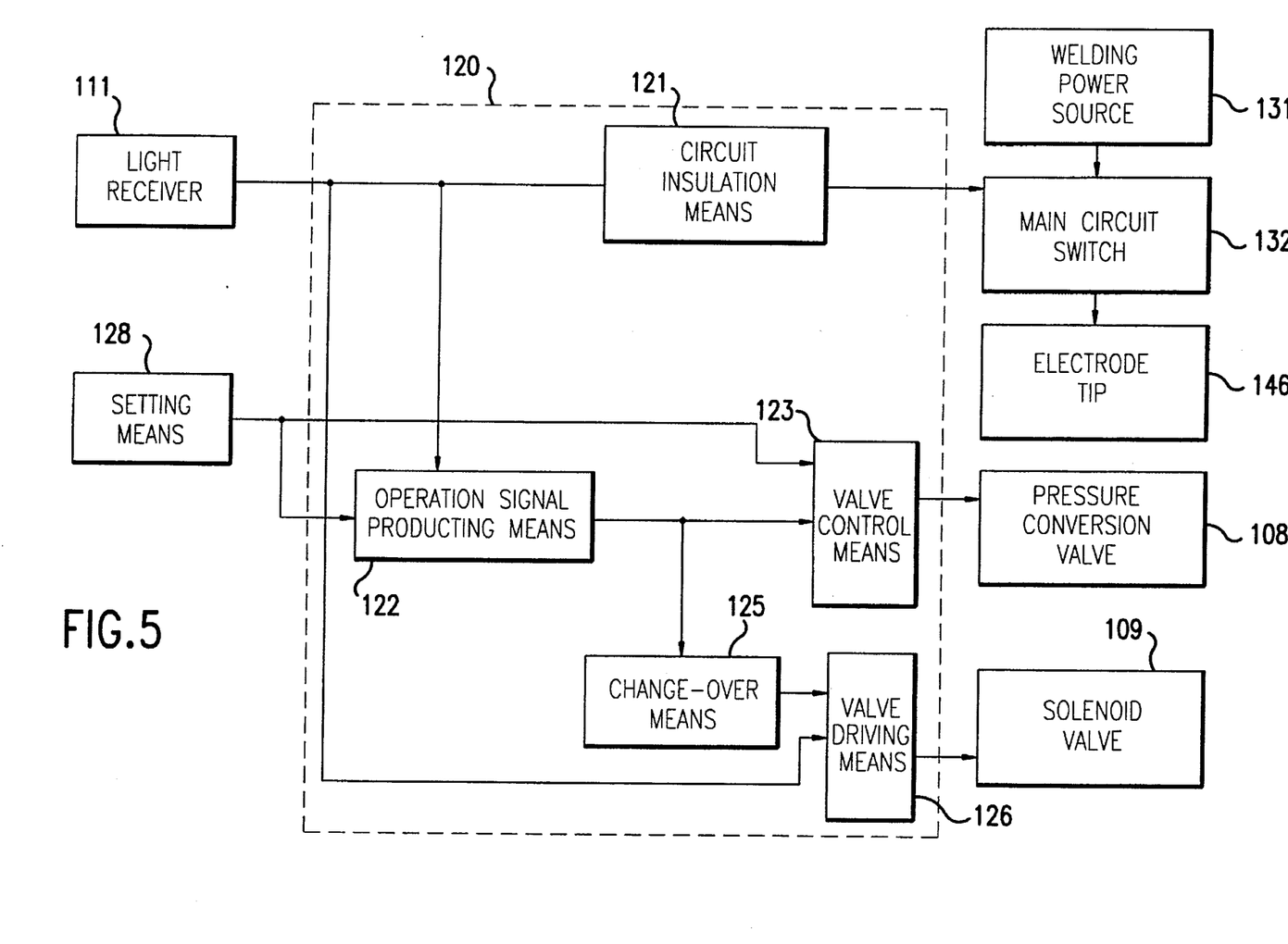
FIG. 5 is a block diagram depicting the control circuit of FIG. 3.

FIG. 3 is a composition drawing showing another preferred embodiment of the present invention. FIG. 4 is a side view showing an example of the portable tip dresser to be used in grinding the electrode tip, and FIG. 5 is a block diagram depicting the control circuit provided on the resistance welder.

In FIGS. 3 to 5, 101 is the welder proper. Energizing plate 103 is fixed securely on the work table 102 of the welder 101. Above the energizing plate 103, movable electrode tip 106, which is vertically operated by elevating pressurized cylinder mechanism 105, is provided for moving face to face with electrode tip 104 by way of energizing plate 107.

The elevating cylinder mechanism 105 operates by-pressurized air from high-pressure air supply source (pressurized fluid supplier) 110 that is supplied by way of pressure conversion valve 108, and solenoid valve 109. Solenoid valve 109 is of the self-recovering type that is able to change the pressure in the portable tip dresser 113 to be mentioned later. The motion of the energizing plate 107 are controlled by signals from the light receiver (transmitting means) 117.

On the other hand, the portable tip dresser 113 of FIG. 4 simultaneously grinds the electrode tip 114 and movable electrode tip 116. The tip dresser 113 is, as shown in FIG. 4, designed to grind electrode tips 104 and 106, that have been inserted through tip insertion ports 114 and 115 provided at the upper and lower surfaces, by rotating blade 116, which is driven by a driving motor (not shown in the Figure).

Further, on this tip dresser 113, the light emitter 117 is provided, which lies face to face with the light receiver 111, that was provided on the welder 101, which was installed in matching with fixed electrode tip 114. At the grip 118 of the light emitter 117, a two-stage switch 119 is provided, which operates the driving motor inside by the first stage and causes light emitter 117 to emit light at the second stage.

On the other hand, control circuit 120, shown in FIG. 5 controls various operations of pressure conversion valve 108 and electromagnetic solenoid valve 109 and ON-OFF of the welding power source. Circuit insulation means 121 is so constructed that it receives output signals from light receiver 111, works on main circuit switch 132 of circuits of thyristors, etc., from welding power source 131 to electrode tips 104 and 106, thereby cutting off the circuit.

Operation signal producing means 122 stores the sequences set by the external setting means such as the keyboards or floppy disk, and in the present preferred embodiment, the operation signals from light receiver 111. The operation signal producing means 122 will generate three types of operation signals to valve control means 123. On the other hand, it is designed so that it will generate the fourth signal to valve control means 123 and change-over means 125. Further, valve control means 123 will, if it receives from operation signal producing 122 the first time operation signal, cause movable electrode tip 146 to apply pressurizing force of, for instance, 70 Kgf. If operation signals of two to four times are received, it has been set beforehand by the setting means 128 to cause movable electrode tip 106 to operate pressure conversion valve 108 in order to apply pressurizing force of 130 Kgf, 30 Kgf and 230 Kgf, respectively.

Valve driving means 126 is designed so that when it receives a detection signal from light emitter 111, it sends a pressurizing signal to solenoid valve 109 from change-over means 125 by way of operation signal producing means 122 and applies to solenoid valve 109 a signal that will lower movable electrode tip 106. On the other hand, it is also so composed that when it receives a pressurization releasing signal from change-over means 125, it produces to solenoid valve 109 a signal that will elevate movable electrode tip 106.

Figure 6:
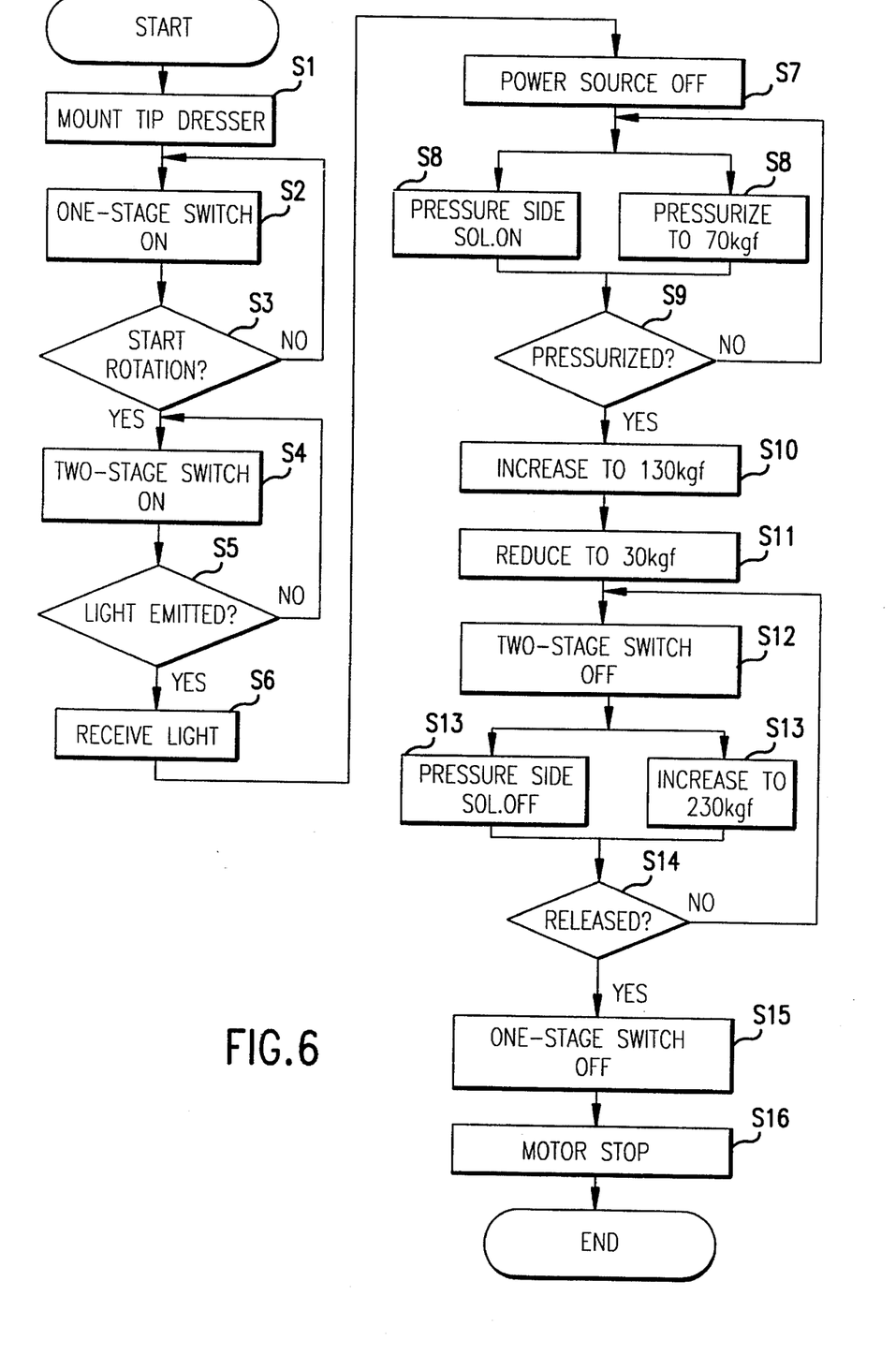
FIG. 6 is a flowchart showing the cutting process of the electrode tip.
Figure 7:
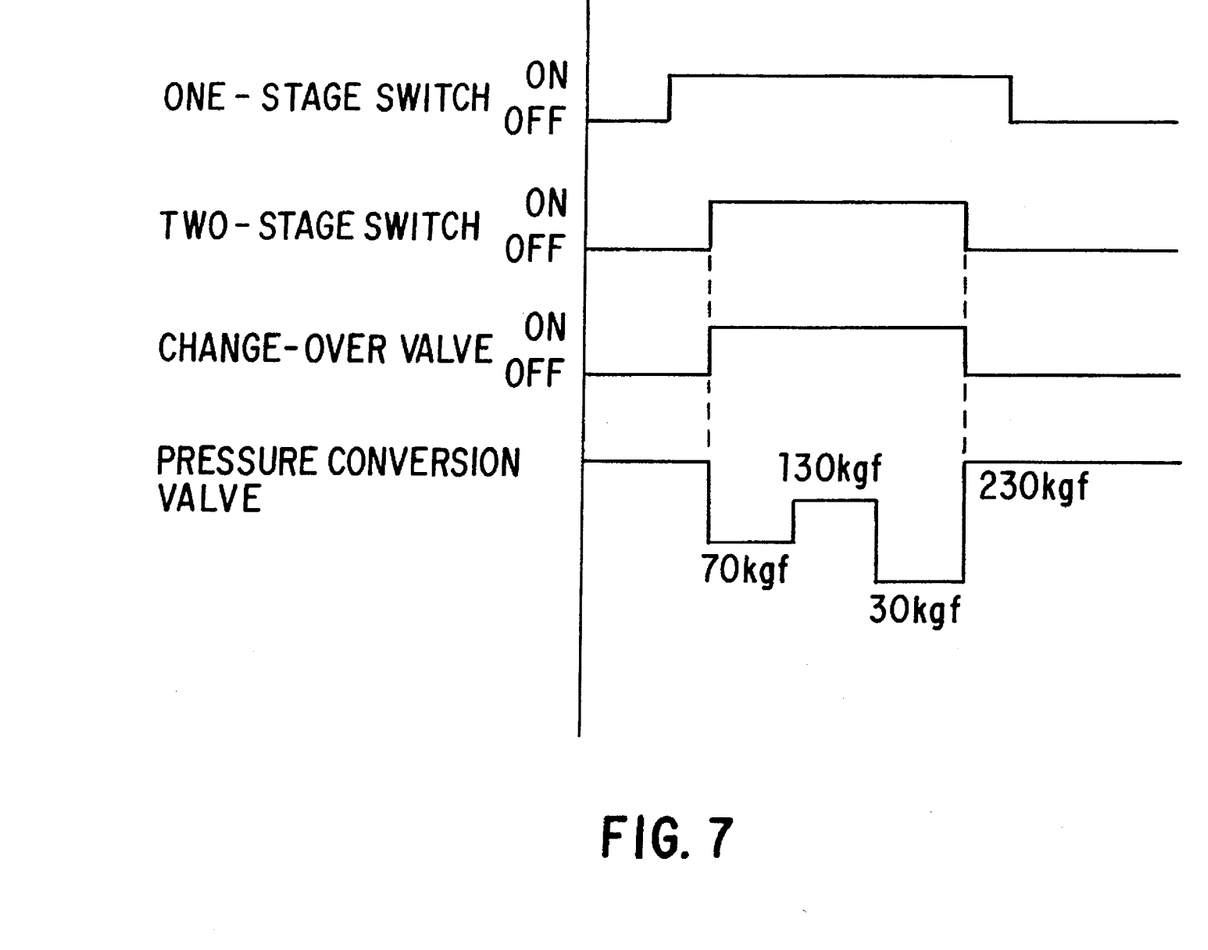
FIG. 7 is a timing chart of the cutting process of the electrode tip.

Next, operations of the equipment, which has been composed as mentioned above, will be explained on the basis of the flow chart in FIG. 6 and the timing chart in FIG.7.

First, the portable tip dresser is fitted to fixed electrode tip 104 (Step S1).

Under this condition, two-stage switch 119, provided at grip 118, is given one-stage pushing operation (Step S2), rotary blade 116 is rotated by starting the driving motor (not shown in the Figure) (Step S3), and second-stage switch 119 is further pushed (Step S4) and light emitter 117 is caused to emit light (Step S5).

By these operations, light receiver 111 at the side of welder 101 receives light from light emitter 117 and detects that tip dresser 12 has been fitted to the predetermined position (Step S6) and applies the detection signal to circuit insulation means 121, and insulate the circuit of welding power source 131 that leads to electrode tips 104, 106 (Step On the other hand, valve driving means 126, which has received detection signals from the light receiver, operates solenoid valve 109 in order to introduce pressurized air into the upper chamber of elevating-use pressurizing cylinder 105. At the same time, operation signal producing means 122 applies the first signal to valve 108, so that pressure will become 70 Kgf and movable electrode tip will come into contact with rotary blade 116 with weak force (Step S8).

As a result, the elevating-use pressurizing cylinder mechanism 105 lowers movable electrode tip 106 on to rotary blade 116 with weak force (Step S9), and without causing strong torque fluctuations to rotating rotary blade 116, without causing excessive gouging to electrode tips 104 and 106 and without causing damage to rotary blade 116, these electrode tips are made to slide into above and below of rotary blade 116.

When predetermined time expires, then, by the second operation signal from operation signal producing means 122, pressure conversion valve 108 is operated by way of valve controlling means 123, the pressure of pressurized air, which is to be supplied to the elevating-use pressurizing cylinder mechanism, is increased to 130 kgf by tip pressurizing force conversion calculation, and with this pressurizing force, the ends and sides of both electrode tips 104 and 106 are roughly dressed (step S10).

When this rough dressing is ended, pressure of pressurized air is reduced to 30 Kgf by tip pressure conversion calculation by the third signal from operation signal producing means 122, and surfaces of both electrode tips 104 and 106 are finish-worked (Step S11).

After switching off light emitter 117 by way of two stage switch 119, (Step S12), valve control means 123 will, when it receives the fourth signal from operation signal producing means 122, control pressure control valve 108, and increase the pressure of pressurized air to 230 Kgf by the pressurized temperature conversion calculation, and simultaneously change-over means 125 applies signals to valve driving means 126 to solenoid valve 109 to the releasing side (Step S13); the pressurized air, which has been raised in pressure to 230 Kgf by tip pressurizing temperature conversion calculation, is directed to the lower chamber of elevating-use pressurizing cylinder mechanism 105, and movable electrode tip 106 is rapidly separated from rotary blade 116, thereby increasing the pressure of pressurized air 9 Step S14).

When a series of operations are ended in this way, finally two-stage switch 119 is operated to turn off the first stage switch (Step S15), and the driving motor is stopped (Step S16), thereby completing a series of operations.

In the above-mentioned preferred embodiment, light emitter 117 and light receiver 111 were provided on tip dresser 113 and welder 101, but the above can be replaced by providing a transmitter and receiver using general electromagnetic waves.

In this way, tip dresser 113 is provided with a transmission means that will produce signals following the rotating operation of rotary blade 116. On the other hand, the pressurizing mechanism, which has been provided on the welder side, has been made to operate by the detection output from the receiving means, that will produce by receiving signals from the transmitting means; hence it has enabled to supplies abnormal contact between electrode tips 104 and 106 and rotary blade 116 due to miss-operation or miss-fitting of tip dresser 113, thereby preventing accidents such as excessive gouging into electrode tips 104 and 106, damage to rotary blade 116 or heating of the driving motor.

Further, pressure of pressurized fluid to be supplied to the elevating-use pressurizing mechanism has been made to change according to "initial contact", "rough grinding" and "finishing". As a result, it has become possible to make the initial contact with rotary blade 116 moderate and to carry out grinding by electrode tips 104 and 106 more effectively and more precisely.

What is claimed is:

1. Pressure controller for a resistance welder comprising:

a pressurized fluid supplier for supplying pressurized fluid;

a pressurizing mechanism for pressurizing a pair of electrode tips with said pressurized fluid;

an electromagnetic valve for controlling said pressurizing mechanism by switching the flow of said pressurized fluid;

a driving controller for controlling the operation of the resistance welder by controlling the electromagnetic valve;

a dressing pressure controller for controlling the pressure exerted by the electrode tips on a cutter of a tip dresser, by controlling said pressurizing mechanism to change the pressure of said pressurized fluid, at the time of dressing said electrode tip;

first connecting means for supplying, at the time of dressing said electrode tip, pressurized fluid from the pressurized fluid supplier to said dressing pressure controller;

second connecting means for supplying the pressurized fluid from the dressing pressure controller to said pressurizing mechanism;

a switching valve for regulating the flow of the pressurized fluid from said driving controller to the pressurizing mechanism at the time of dressing by said electrode tip; and wherein said pressure of the electrode tips exerted on said dressing cutter is controlled during the dressing operation of a plurality of resistance welders each having a pair of electrodes.

2. The pressure controller according to claim 1, wherein said first connecting means includes a first joint provided in the piping of the pressurized fluid, between said pressurized fluid supplier and said electromagnetic valve, and a second joint provided on said pressure controller detachably engaged with said first joint.

3. The pressure controller according to claim 1, wherein said first connecting means includes a branching pipe in communication with the piping of said pressurized fluid between said pressurized fluid supplier and said electromagnetic valve, and a switching valve interposed in said branching pipe.

4. The pressure controller according to claim 1, 2 or 3, wherein said second connecting means includes a first joint, which is provided in the piping of the pressurized fluid between the switching valve, that regulates the flow of the pressurized fluid from the driving controller, and the pressurizing mechanism and a second joint which has been provided at the dressing pressure controller side, that is detachably engaged with said first joint, of said second connecting means.

5. The pressure controller according to claim 1, 2 or 3, wherein said second connecting means includes a branching pipe in communication with the piping of said pressurized fluid between the switching valve regulating the flow of the pressurized fluid during the electrode tip dressing operation from the driving controller and said pressurizing mechanism, and a switching valve interposed in said branching pipe.

6. The pressure controller according to claim 5, wherein said dressing pressure controller includes a proportional valve to convert said pressurized fluid to the predetermined pressure in response to a signal which is representative of the desired pressure at the time of dressing the electrode tip, and a solenoid valve for controlling the pressurizing mechanism by switching the flow of the pressurized fluid, and said proportional valve is provided at the inlet side of the pressurized fluid and said solenoid is provided at the outlet side of the pressurized fluid.

7. The pressure controller according to claim 6, further comprising a receiving means to receive the signal from a transmitting means, when the tip dresser is at the predetermined fitting position, and said dressing pressure controller controls the pressurizing mechanism by receiving the signal detection output from said receiving means.

8. The pressure controller according to claim 7, further comprising a pressure switching means for switching the pressure, selectively in time series, from the force required to cause initial contact of the electrode tip with the cutter of the tip dresser, the force required to carry out rough grinding and the force required for finishing.

\* \* \* \* \*